Figure 1:
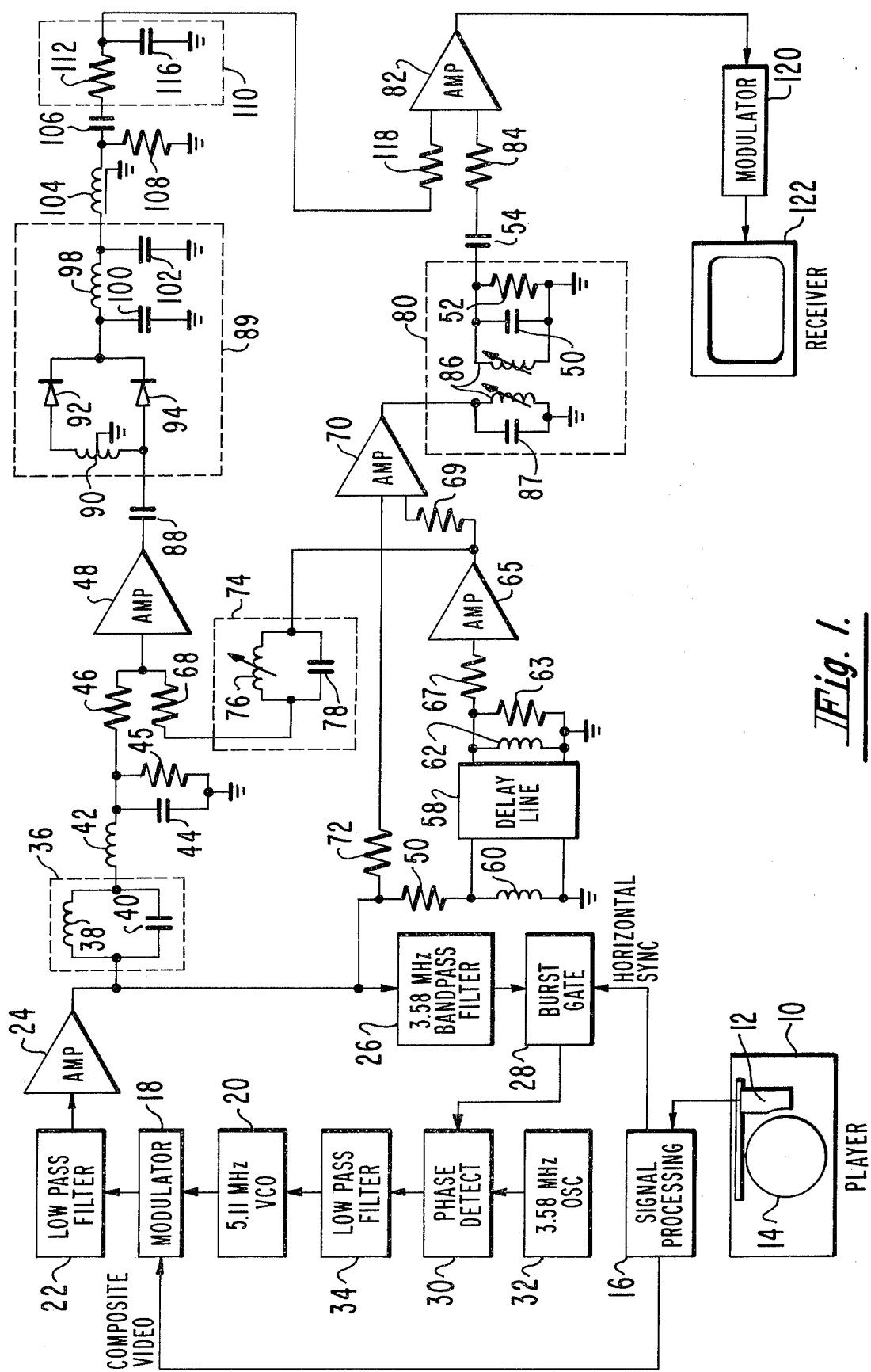

United States Patent [19]
Amery

[11] 3,938,179
[45] Feb. 10, 1976

[54] COMB FILTER FOR VIDEO PROCESSING

[75] Inventor: John Gordon Amery, Indianapolis, Ind.

[73] Assignee: RCA Corporation, New York, N.Y.

[22] Filed: Sept. 16, 1974

[21] Appl. No.: 506,446

[52] U.S. Cl. .................. 358/4; 358/11; 358/31; 178/DIG. 19
[51] Int. Cl.².. H04N 9/535; H04N 9/42; H04N 5/76
[58] Field of Search ............ 358/21, 31, 4, 9, 8, 11, 358/12; 178/DIG. 19; 360/36

[56] References Cited
UNITED STATES PATENTS

| | | | |
|---|---|---|---|
| 2,729,698 | 1/1956 | Fredendall | 358/31 |
| 2,811,578 | 10/1957 | Reike | 358/31 |
| 3,542,945 | 11/1970 | Parker | 358/31 |
| 3,674,920 | 7/1972 | Faroudja | 358/31 |
| 3,728,476 | 4/1973 | Bates et al. | 358/31 |
| 3,730,983 | 5/1973 | Numakura et al. | 358/4 |
| 3,895,393 | 7/1975 | Drummond | 358/31 |

Primary Examiner—George H. Libman
Assistant Examiner—R. John Godfrey
Attorney, Agent, or Firm—Eugene M. Whitacre; Stephen Siegel; William H. Meagher

[57] ABSTRACT

A composite video signal recorded in a non-standard encoding format is rearranged in a format which can be decoded by standard television circuitry. Simplified circuitry utilizing a relatively inexpensive, narrow band delay line is provided for separating the luminance and chrominance signal components from the non-standard signal. Additional circuitry recombines the separated signal components into a desired composite signal format. Filters are incorporated for providing attenuation to particular frequency regions of the luminance and chrominance signals for effecting a relatively uniform frequency response in the resultant composite signal.

13 Claims, 6 Drawing Figures

COMB FILTER FOR VIDEO PROCESSING

This invention relates to video signal processing and more particularly to apparatus for transcoding the luminance and chrominance signal components of a composite video signal from one format to another.

In a copending U.S. Application entitled, "COLOR INFORMATION TRANSLATING SYSTEMS," in the name of Dalton H. Pritchard, Ser. No. 350,777, now U.S. Pat. No. 3,872,498 a color signal encoding format is disclosed wherein a chrominance signal component in the form of a modulated subcarrier is interlaced in the midband of a wider band luminance signal. An encoded video signal of this type, referred to as a buried subcarrier signal, may be formed by first comb filtering the luminance signal component at least in the area where chrominance signal components are to be inserted. By comb filtering this region of the luminance signal, troughs in the signal region at frequencies corresponding to odd multiples of one-half the horizontal line frequency may be prepared for insertion of an associated chrominance signal. Similarly, the chrominance signal components may be comb filtered in a manner to form troughs in this signal at frequencies that correspond to even multiples of one-half the horizontal line frequency. The combed chrominance and luminance signals may then be combined to form a composite signal having a chrominance signal component interleaved within the passband of the luminance signal component.

The above-described coded signal format is particularly useful for information storage in video disc for reasons delineated in the aforementioned Pritchard application. One type of video disc reproducing system that employs the buried subcarrier format utilizes apparatus that senses the capacitance between a stylus playback device and a disc record to reconstruct the video information embossed within the spiral groove on the record. In such systems, the video information is recorded in the form of geometric variations in the spiral groove on the surface of the record. The disc surface may include a conductive material covered with a thin coating of dielectric material. A metal electrode associated with the stylus playback device cooperates with the conductive material and dielectric coating to form a capacitor. Capacitance variations due to the signal representative geometrical variations in the spiral groove are sensed and decoded to provide a video representative output signal. A detailed description of a capacitive video disc system is described in a copending U.S. Patent Application, Ser. No. 126,772, now U.S. Pat. No. 3,842,194 in the name of Jon K. Clemens and entitled, "INFORMATION RECORDS AND RECORDING/PLAYBACK SYSTEMS THEREFOR."

In one arrangement, it may be desirable to interface a video disc player with a standard television receiver or a television monitor which utilizes standard television circuitry. In either arrangement, it is desirable to provide video signal information in a form that may easily be decoded by the standard television circuitry. To provide such signals, the buried subcarrier signal information that is provided by the video disc player may be rearranged into a signal format such as that prescribed by the National Television Standards Committee (NTSC). By rearranging the video signal into a standard format, signal decoding may be achieved by standard television circuitry. Illustratively, an NTSC type of signal may be formed from a buried subcarrier signal by removing the chrominance information from within the luminance signal passband and translating it in the form of sidebands of a relatively low frequency subcarrier to sidebands of a subcarrier at a frequency such as 3.58 MHz where it may then be reinserted with the luminance signal component. Although the resulting signal does not conform precisely to the standards provided by the National Television Standards Committee (NTSC), it has sufficiently close characteristics to the NTSC type of signal that it may be easily decoded by a standard television receiver. A system which provides transcoding of buried subcarrier signals into NTSC type of signals is described in a copending application in the name of John G. Amery et al. entitled, "SIGNAL TRANSLATING APPARATUS", Ser. No. 351,036 now U.S. Pat. No. 3,872,497.

Signal transcoding systems such as the one described in the above-referenced patent application, transcode buried subcarrier type signals into NTSC type signals by first forming a comb filtered chrominance signal component from the composite buried subcarrier signal. The combed chrominance signal component is then subtracted from the composite buried subcarrier signal to provide a combed luminance signal component substantially free of chrominance signal information. Luminance and chrominance signal components are then recombined such that the chrominance signal component is about a new subcarrier frequency of, for example, 3.58 MHz, and the luminance component about a baseband frequency.

One problem that arises in systems in which a combed luminance component is formed by subtracting a combed chrominance signal component from the composite buried subcarrier signal is that undesired phase shifts or delays in the associated circuitry through which the combed chrominance signals pass, may result in an imprecise phase relation between the luminance portion of the composite video signal and the chrominance signals. If the phase relation between these two signals is not precise, inadequate removal of the chrominance signal from the composite signal occurs undesirably leaving a luminance signal component having chrominance information therein. Phase shifts and minor delays in the circuitry associated with the combed chrominance signal component may be caused by component drift. Such component drift may be due to component aging or temperature effects. If the components in the path of the combed chrominance signal drift sufficiently to effect as much as a 23 nanosecond delay, a phase error in the order of 30° may be created. Any phase error between the combed chrominance signal and the composite buried subcarrier signal may greatly reduce the subtractive attenuation of the chrominance signal component from the composite signal. Failure to substantially attenuate the chrominance component in the luminance signal results in a formation of dots in the displayed image causing a degraded picture. In order to eliminate this problem of component drift, it is desirable to provide apparatus which derives combed luminance and chrominance components without having to subtract one of these components from a composite signal to form the other.

It is further desirable to provide a combed luminance signal component which has a relatively flat frequency response over its entire bandwidth. In some of the prior art systems, a luminance signal component having a relatively flat frequency response was difficult to obtain because of the manner in which signals were added and subtracted to form this component. Luminance signal components having a nonuniform frequency response over their bandwidth may provide an undesirable video response on the television monitor. This undesirable response may appear in the resultant television image in the form of bright white regions following transitions from black towards white. It is therefore desirable to provide a combed luminance signal component having a relatively flat frequency response over the bandwidth of the luminance signal. It will be appreciated that these and other desirable features must be accomplished in a simple and economic manner suitable for mass manufacture.

Thus, in accordance with the present invention, there is provided simplified apparatus receptive to a first video signal having a chrominance signal component of a particular bandwidth in the form of a modulated subcarrier of a first frequency interleaved within a portion of the passband of an associated luminance signal component, the apparatus being suitable for transcoding the first video signal to a second video signal having a luminance signal component and a chrominance signal component in the form of a modulated subcarrier at a second frequency. The apparatus includes means for receiving a first video signal. Means are provided for frequency translating the constituent frequency portions of the first video signal to frequencies equal to the sum and difference of these constituent frequency portions and a third frequency such that a portion of the translated signal has a chrominance subcarrier at a frequency corresponding to the above-mentioned second frequency. Filter means are coupled to the translating means for providing attenuation to the frequency translated signals about a frequency corresponding to the sum of the above-mentioned first and third frequencies. Delay means are further coupled to the translating means for providing a predetermined delay to signals passing therethrough. A luminance signal component that is substantially free of chrominance signals is formed from the first video signal by means tthat are responsive to signals provided by the filter means and the delay means. A chrominance signal component that is substantially free of luminance signals is formed from the first video signal by a second means that is responsive to signals provided by the frequency translating means and the delay means. Detecting means are coupled to the output of the first means for demodulating signals provided thereto. Signals provided by the detecting means and the second means are combined by means for forming a video output signal. The video output signal is a composite video signal having a luminance component and chrominance modulated subcarrier at the above-mentioned second frequency.

A complete understanding of the invention can be obtained from the following description when taken in conjunction with the accompanying drawings of which:

FIG. 1 is a partial block and schematic drawing of a video disc player and transcoding circuitry embodying the invention; and FIGS. 2a – 2e illustrate passband characteristics of the apparatus in FIG. 1. A cross-hatched region accompanying each of the above passband figures represents the area in which luminance and chrominance signal components overlap.

In the apparatus illustrated in FIG. 1, a video disc player 10 having a signal pickup arm 12 is arranged for sensing signal information on an associated video disc 14. Signal processing circuitry 16 receives signals from player 10 and provides a composite video signal to modulator 18. The composite video signal provided by processing circuitry 16 has a baseband luminance component and an interleaved chrominance component in the form of sidebands of a modulated subcarrier at a frequency of about 1.53 MHz. A voltage controlled oscillator (VCO) 20 having a nominal frequency of 5.11 MHz is further coupled to modulator 18 and provides a signal with which the composite video is mixed. Modulator 18 may be of a singly balanced type for which the video input portion is balanced. By utilizing a balanced type of modulator, the baseband video modulating component is substantially eliminated from the modulator output signal. VCO 20 is further arranged to drive modulator 18 in a chopping mode. A chopping mode modulator is desirable for reducing intermodulation products between the chrominance carrier and the VCO signal to an acceptable level. Signals provided by modulator 18 are coupled through low-pass filter 22. Filter 22 is arranged to pass the first modulation product signal provided by modulator 18 and attenuate all other signals of greater frequency. An amplifier 24 receives signals from low-pass filter 22 and provides a gain to these signals. Signals provided by amplifier 24 are coupled to bandpass filter 26. Filter 26 has a passband centered about 3.58 MHz which coincides with the location of the chrominance subcarrier of the applied signal. Burst gate 28, in response to horizontal synchronization signals provided by video processing circuit 16, gates the burst reference signal component provided by signals passing through bandpass filter 26. Signals provided by gate 28 are coupled to phase detector 30 where they are compared in phase to signals provided by a 3.58 MHz crystal oscillator 32. The phase detected error signal provided at the output of phase detector 30 is coupled to a low-pass filter 34 in order to pass only the difference signal between that provided by burst gate 28 and oscillator 32. Signals provided by filter 34 are coupled to VCO 20 and operate to control the output frequency of this voltage controlled oscillator.

Signals provided by amplifier 24 are further coupled to a band reject (notch) filter 36. Filter 36 provides attenuation to those signals centered about a frequency of 6.64 MHz and is comprised of the parallel combination of inductor 38 and capacitor 40. A delay network comprised of the combination of inductor 42, capacitor 44 and resistor 45 is coupled to the output of filter 36. Signals provided by filter 36 that have been delayed by the latter delay network are coupled through a summing resistor 46 to an input of summation amplifier 48.

A delay line 58 receives signals from amplifier 24 through a resistor 50 and provides a delay to these signals of about 63.5 microseconds. An inductor 60 is coupled across the input terminals of delay line 58 for providing proper input impedance matching. Similarly, the parallel combination of inductor 62 and resistor 63 is coupled across the output terminals of delay line 58 for matching the output impedance of this line. A buffer amplifier 65 receives signals provided by delay line 58 through a resistor 67. Signals provided by amplifier 65 are coupled through a resistor 69 to an input terminal of a difference amplifier 70. A second input terminal of difference amplifier 70 receives signals provided by amplifier 24 through a resistor 72. Signals provided by buffer amplifier 65 are further coupled to a summation amplifier 48 through a second band reject filter 74 comprised of the parallel combination of capacitor 78 and inductor 76 in shunt with the resistance provided by resistor 68. Filter 74 provides attenuation of signals about a frequency of 5.11 MHz and forms a desired frequency response characteristic to the delayed signals provided to summation amplifier 48.

An envelope detector 89 is coupled to an output terminal of amplifier 48 through a capacitor 88. Detector 89 is comprised of a transformer 90 arranged in a full wave detector configuration with a pair of commonly connected diodes 92 and 94 coupled between the output terminals of transformer 90. Detected signals provided at the common connection of diodes 92 and 94 are coupled to a low-pass filter comprised of a series inductor 98 in $\pi$ configuration with capacitors 100 and 102. The output of detector 89 is coupled to a delay line 104. A resistor 108 is coupled across the output terminals of delay line 104 to provide impedance matching for this line. Signals provided at the output of delay line 104 are coupled through a capacitor 106 to a de-emphasis circuit 110. De-emphasis circuit 110 is comprised of a series resistor 112 coupled in shunt with a capacitor 116. An adding resistor 118 couples signals from de-emphasis circuit 110 to an input terminal on an output amplifier 82. Amplifier 82 further receives signals provided by difference amplifier 70 and combines these signals with those provided through resistor 118.

A bandpass filter 80 is interposed between difference amplifier 70 and output amplifier 82. Filter 80 is comprised of a transformer 86 having a tunable primary winding in resonance with a shunt capacitor 87 and a tunable secondary winding in resonance with a capacitor 50 and a resistor 52. A series RC coupling network comprised of resistor 84 and capacitor 54 is coupled between filter 80 and amplifier 82.

Output signals from amplifier 82 are coupled to a modulator 120 wherein an RF carrier corresponding to at least one television channel frequency is modulated. The modulated RF signal from modulator 120 is thereafter coupled to a television receiver 122 for reproduction of the information derived from player 10.

Figure 2A:
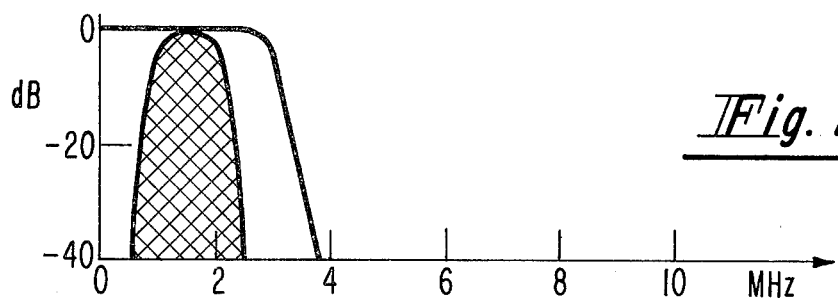

In the operation of the above-described circuitry, signals embossed on video disc 14 are decoded with the aid of pickup arm 12 and video processing circuit 16. Signals provided by processing circuit 16 are in a buried subcarrier format. The buried subcarrier format includes a wide-band luminance component having a bandwidth of about 3 MHz and a narrow-band chrominance component of about .4 MHz in the form of sidebands of a modulated suppressed subcarrier at 1.53 MHz. FIG. 2a illustrates the passband characteristic at the output terminal of circuit 16 and indicates by a cross-hatch area of the region occupied by both luminance and chrominance components. The chrominance signal component is similar to its NTSC counterpart in that it is comprised of the sum of respective quadrature related subcarrier phases respectively amplitude modulated with red and blue color difference signals (R-Y, B-Y). The buried subcarrier signal is further comprised of reference burst oscillations during the horizontal blanking interval at the buried subcarrier frequency (1.53 MHz). The reference burst corresponds to a standard NTSC color synchronizing component in all but frequency and number of cycles.

In the aforesaid Pritchard application, it is noted that in video disc playback operations one may encounter for a variety of reasons undesired variations of the speed of relative motion between the pickup stylus and the record groove that may result in spurious variations of the recovered signal frequencies. Thus, the recovered buried subcarrier signal may be subject to jitter about their otherwise expected locations in the frequency spectrum.

Figure 2B:
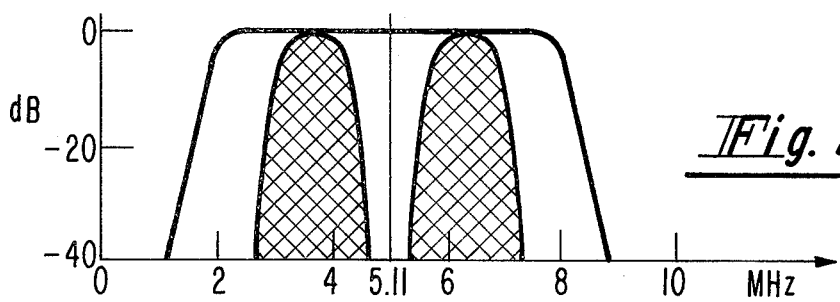

Jitter of the video signal provided by processing circuit 16 is desirably stabilized in order to accurately separate the interleaved luminance and chrominance signal components. To reduce the amount of signal jitter, a mechanical arm stretcher may be employed. One type of mechanical arm stretcher physically repositions the stylus of the signal pickup arm along the information groove of the record in synchronism with the jitter in the recovered signal. An arm stretcher is described in U.S. Pat. No. 3,711,641, entitled "VELOCITY ADJUSTING SYSTEM", by R. C. Palmer assigned to RCA Corporation. Though effective in reducing signal jitter, an arm stretcher may not provide sufficient signal stability for accurately separating the interleaved luminance and chrominance signal components of the video signal. To ameliorate the problem of signal stability, the video signal provided by circuit 16 is heterodyned in modulator 18 by the 5.11 MHz VCO which is caused to jitter in consonance with the jitter of a particular component in the video signal. The particular signal component to which the entire video signal is stabilized is the color reference burst signal. Hence, at least the resultant translated chrominance signal component (about a jittering 5.11 MHz carrier) becomes substantially jitter free. Signals provided by modulator 18 are passed through a low-pass filter 22 and an amplifier 24. Filter 22 has a passband of about 8 MHz which allows passage of the frequency translated video signal. A representation of the frequency response characteristics at the output terminal of filter 22 is illustrated in FIG. 2b.

The translated video signal has upper and lower sideband components, each of which contains luminance signal components with associated interleaved chrominance signal components. In the lower sideband portion of the translated video signal, the chrominance subcarrier burst signal which appeared in the baseband signal at 1.53 MHz is translated in frequency by the 5.11 MHz carrier signal to 3.58 MHz (see crosshatched region of FIG. 2b). By phase detecting this translated subcarrier signal and comparing it to a signal provided by a reference oscillator, an error signal representing signal jitter may be generated to control the 5.11 MHz VCO. To form an appropriate error signal, a bandpass filter 26 having a center frequency of 3.58 MHz is employed to pass the translated subcarrier burst signal to a burst gate 28. Burst gate 28 gates the translated subcarrier signals in response to horizontal sync signals provided by processing circuit 16, and passes these gated signals to a phase detector 30. Phase detector 30 compares the reference burst signal to a 3.58 MHz crystal oscillator 32 and produces signals corresponding to the sum and difference of the two compared signals. A low-pass filter 34 passes only the difference signals (error signals) provided by detector 30 to VCO 20 which correspondingly shifts in output frequency to delete these error signals. The jittered 5.11 MHz output signal of VCO 20 mixes with composite video signals in modulator 18 to form a translated video signal about a nominally 5.11 MHz carrier.

Frequency translated signals provided at the output of amplifier 24 are coupled through one path containing band reject filter 36 and another path containing a delay line 58. Signals passing through filter 36 are attenuated about a frequency of 6.64 MHz. The 6.64 MHz frequency corresponds to the location of the chrominance subcarrier component associated with the upper sideband of the frequency translated video signal. The necessity of attenuating the chrominance signal component on the upper sideband will become clear later on in this specification with reference to forming a luminance signal component.

Figure 2C:
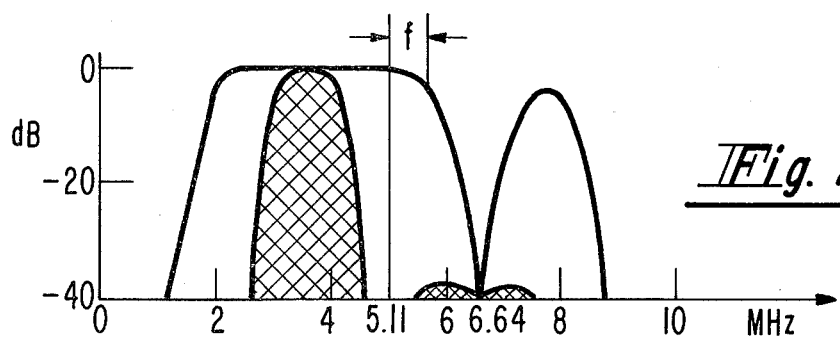
Figure 2D:
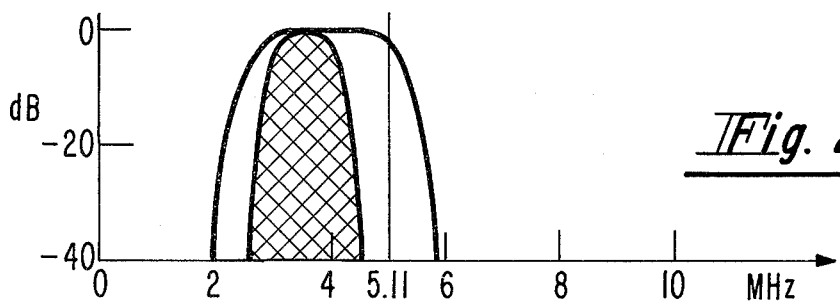

Signals provided to delay line 58 are delayed by about 63.5 microseconds (the time for one horizontal scan line — 1H) and band limited by this delay line to a 3db bandwidth of about 2.8 MHz to 5.5 MHz. The frequency response characteristic at the output terminal of delay line 58 is illustrated in FIG. 2d. It will be appreciated that a delay line having a relatively narrow passband, such as delay line 58, may be considerably more economical to purchase then the broad bandwidth counterpart used in other transcoding systems.

Signals provided at the output of delay line 58 have chrominance components that are substantially 180° out-of-phase with the chrominance components of the nondelayed signals provided by amplifier 24 and luminance components that are substantially in-phase with the nondelayed signals. These delayed video signals, having associated phase shifted chrominance components, may be utilized to extract the luminance and chrominance signal components from the nondelayed composite video signal.

Figure 2E:
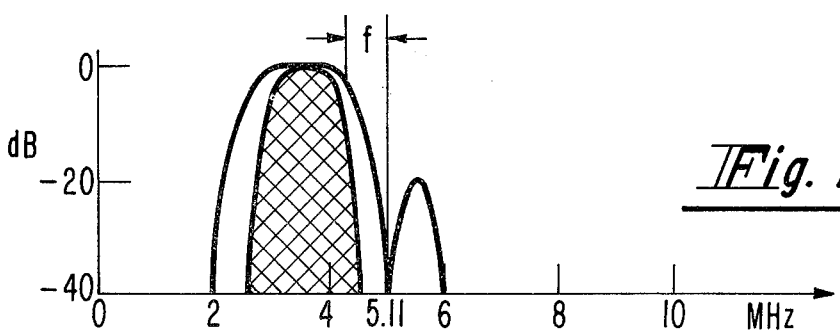

In the formation of a luminance signal component, the delayed signals provided at the output of delay line 58 are passed through a band reject filter 74. Band reject filter 74 is a notch filter centered at a frequency of about 5.11 MHz. Filter 74 effectively attenuates frequencies in the area of 5.11 MHz so that signals provided thereby correspond to substantially only the lower sideband of the frequency translated composite video signal, i.e., 2.8 MHz to 5.11 MHz. FIG. 2e illustrates the passband response at the output terminal of filter 74. Delayed signals provided at the output of filter 74 add at the summing junction of resistors 46 and 68 with the nondelayed signals that have passed through filter 36. When the delayed and nondelayed signals are added, the in-phase components (luminance components) add and the out-of-phase components (chrominance components) cancel. Since the chrominance portion of the delayed signal (signals occupied by the cross-hatched region of FIG. 2e) is mainly available in the lower sideband of this signal, cancellation of the chrominance component in the nondelayed signal occurs mainly in the corresponding lower sideband region. The chrominance component in the upper sideband region of the nondelayed signal is attenuated by notch filter 36 which has a center frequency at 6.64 MHz. FIG. 2c illustrates the passband characteristics present at the output terminal of filter 36. Hence, the resultant signals provided at the output of amplifier 48 are substantially free of chrominance signal components.

Vertical detail in the recorded image is produced by signals occupying about the first 400 KHz of the baseband video signal. These vertical detail signals have similar phase characteristics to the chrominance components and therefore reverse in phase when passed through the 1H delay line 58. To avoid cancellation of the vertical detail signals at the summing junction of resistors 46 and 68, filter 74 is employed. Filter 74 has a center frequency at 5.11 MHz and a 3db point corresponding to a desired vertical detail bandwidth, i.e., 400 KHz from center frequency. The vertical detail bandwidth is illustrated in FIG. 2e by the letter $f$. By filtering the delayed signal about the region of desired vertical detail, cancellation of the vertical detail in the nondelayed signal (at the summing junction of resistors 46 and 68) is avoided. The 3db point of filter 36 is adjusted in a corresponding manner to that of filter 74 for providing a desired passband of vertical detail signals on each side of the 5.11 MHz carrier (see bandwidth $f$ in FIG. 2c).

Amplifier 48 amplifies the signals summed at its input terminal and couples these signals to a detector 86. Detector 86 is arranged in a full wave configuration for sampling both positive and negative peaks of the applied signal. This method of detection allows sampling of the video information at substantially twice the carrier frequency, i.e., 10.22 MHz. A low-pass filter comprised of capacitors 100, 102 and inductor 98 has a roll-off frequency of about 4 MHz and operates to attenuate the 10.22 MHz sampling frequency after signal detection. The resultant signal produced at the output of detector 86 is a baseband luminance signal component substantially free of chrominance signal components.

A chrominance signal component substantially free of luminance signal components is formed in a similar manner to the formation of the luminance signal component. Signals provided by delay line 58 are subtracted from the nondelayed video signals provided to the input of amplifier 70. By subtracting the delayed signal provided by delay line 58 from the nondelayed composite signal provided by amplifier 24, luminance signal components in the lower sideband portion of the nondelayed signal cancel while the chrominance signal components in the lower sideband add. In order to provide an output signal that is substantially only chrominance signal components, it is desirable to attenuate the luminance components in the resultant signal that were not cancelled in the subtraction process. To provide attenuation to the noncancelled luminance components, a bandpass filter 80 having a passband of 3 to 4 MHz is utilized. Signals provided at the output of bandpass filter 80 are substantially only chrominance signal components having a desired subcarrier frequency of 3.58 MHz. An NTSC type of video signal may now be formed by combining the detected luminance signal component (output signal of detector 89) with the chrominance signal component derived from filter 80. In order to combine the luminance and chrominance components in proper phase relationship, a delay line 104 is incorporated. Delay line 104 is coupled to the output of detector 89 and operates to provide a desired delay to the luminance signal component. A de-emphasis circuit 110 is further arranged in the path of the luminance signal component to compensate for the pre-emphasis placed on this signal during the recording process. Signals provided at the output of de-emphasis circuit 110 are added to the chrominance signal components by a summation amplifier 82. Luminance and chrominance signal components combined in amplifier 82 form a composite video signal having a relatively uniform frequency response. The relatively uniform frequency response of the composite signal is due to the characteristics of the delayed and nondelayed signals.

Illustratively, the baseband luminance signal component is formed by the addition of the delayed and nondelayed signals that have passed respectively through filters 74 and 36 and thereafter, in combination, have passed through detector 86. The passband characteristic that the delayed and nondelayed signals have been subjected to is illustrated respectively in FIGS. 2e and 2c. For purposes of the following example, it will be assumed that the translated video signal provided by amplifier 24 has a uniform signal energy over the frequency range of 2 to 8 MHz. Thus, signals provided at the output of filter 36 have a frequency spectrum that is substantially as shown in FIG. 2c. If this signal alone is passed through detector 86, the resultant detected signal will be uniform except for a 6db depression in the region about 1.53 MHz. This depression is caused by the absence of signal energy in the corresponding upper sideband region about 6.64 MHz. By adding the signal provided by filter 74, which corresponds in shape to that shown in FIG. 2e, to the signal provided by filter 36, the above-noted 6db depression is effectively removed. The resultant luminance signal component is thereby formed with a relatively uniform frequency response.

The composite video signals produced at the output of amplifier 82 are coupled to a modulator 120 which is arranged to provide an output signal corresponding in frequency to at least one standard television channel. Hence, signals provided by a video disc and in the form of a buried subcarrier format may be transcoded to a format similar to NTSC type of video signals and provided at an RF carrier frequency to a standard television receiver.

What is claimed is:

1. In a system receptive to a first composite video signal having a nominal line frequency and including a luminance signal component occupying a given band of frequencies and a chrominance signal component interleaved therewith within only a portion of said given band, said chrominance component being in the form of sidebands of a subcarrier at a first frequency; apparatus for transcoding said first composite video signal to a second composite video signal having a chrominance signal component in the form of sidebands of a subcarrier at a second frequency comprising:

means for receiving said first composite video signal;

means for frequency translating the constituent frequency portions of said first composite video signal such that a portion of said translated signal has a chrominance subcarrier at a frequency corresponding to said second frequency, said frequency translating means comprising means for amplitude modulating oscillations of a third frequency in accordance with the output of said receiving means;

band rejection filter means coupled to said translating means for providing attenuation to said frequency translated signal about a frequency corresponding to the sum of said first and third frequencies;

delay means coupled to said translating means for providing a predetermined delay, substantially corresponding to a period at said nominal line frequency, to signals passing therethrough, said delay means having a passband of lesser bandwidth than said luminance signal component but of greater bandwidth than said chrominance signal component and encompassing said second frequency;

first comb filter means responsive to signals provided by said band rejection filter means and said delay means for forming a luminance signal component that is substantially free of chrominance signals;

second comb filter means responsive to signals provided by said frequency translating means and said delay means for forming a frequency translated chrominance signal component that is substantially free of luminance signals; and means for combining signals formed by the respective first and second comb filter means for providing said second composite video signal.

2. Apparatus according to claim 1 wherein said band rejection filter means is a notch filter providing maximum attenuation at said frequency corresponding to the sum of said first and third frequencies.

3. Apparatus according to claim 2 wherein said first comb filter means includes a summing amplifier arranged for combining signals provided by said band rejection filter means and said delay means.

4. Apparatus according to claim 3 wherein said second comb filter means includes means for placing said delayed signal in inverted relationship with said translated signal; and a summing amplifier arranged for receiving said translated signal and said inverted signal.

5. Apparatus according to claim 4 wherein said first comb filter means also includes a detecting means responsive to the output of said first-named summing amplifier for translating signals provided by said first-named summing amplifier to a baseband.

6. Apparatus according to claim 1 wherein further band rejection filter means are interposed between said delay means and said first comb filter means for providing attenuation to signals about said third frequency.

7. Apparatus according to claim 6 wherein said first-named band rejection filter means is a notch filter having a band reject characteristic with a particular amount of attenuation at a frequency spaced above said third frequency by a predetermined amount of frequency separation; and said further band rejection filter means is a notch filter having a band reject characteristic with said particular amount of attenuation at a frequency spaced below said third frequency by substantially said predetermined amount of frequency separation.

8. Apparatus according to claim 7 wherein said predetermined amount of frequency separation is substantially 400 kilohertz and said particular amount of attenuation is 3 decibels.

9. Color television signal processing apparatus comprising:

means for receiving composite video signals having a luminance signal of relatively broad bandwidth and a chrominance signal of relatively narrow bandwidth having components interleaved with components of said luminance signal in a given frequency band;

means for heterodyning said received composite video signals with oscillations of a first frequency to form a second signal comprising a carrier component at said first frequency and video modulated upper and lower sidebands thereof;

a delay means coupled to said heterodyning means for providing a predetermined delay to said second signal, said predetermined delay substantially corresponding to a period at the line frequency of said composite video signals;

means for forming a chrominance signal occupying a frequency band shifted from said given frequency band and substantially free of luminance signal components; said forming means comprising a first comb filter including means for combining the outputs of said heterodyning means and said delay means;

a first filter means coupled to said heterodyning means for attenuating components of said second signal having frequencies falling within the boundaries of the region in said upper sideband occupied by interleaved chrominance signal components relative to components of said second signal having frequencies falling in said lower sideband, at said first frequency, and in other regions of said upper sideband;

a second filter means coupled to said delay means for providing attenuation to signal components of frequencies falling in a relatively narrow region of said sidebands centered about said first frequency;

means for providing a luminance signal substantially free of chrominance signal components; said providing means comprising a second comb filter including means for combining the outputs of said first and second filter means, and a detector responsive to the output of said second comb filter;

means for combining the outputs of said first comb filter and said detector to form output composite video signals having luminance and chrominance signal components in a frequency spaced relationship substantially without frequency overlap.

10. Apparatus in accordance with claim 9 wherein said delay means passes the carrier component of said second signal, and at least a major portion of said lower sideband contiguous with said first frequency, to the relative exclusion of said upper sideband.

11. In a video disc player including pickup apparatus for recovering composite video signals from a rotating video disc record, said composite video signals comprising a wideband luminance signal occupying a given band of frequencies, and a chrominance signal having components interleaved with components of said luminance signal within only an intermediate portion of said given band, said chrominance signal comprising sidebands of a color subcarrier having a first frequency value when a desired speed of relative motion is established between said pickup apparatus and said record; transcoding apparatus comprising, in combination:

a source of oscillations having a second frequency value when said desired speed of relative motion is established;

modulating means responsive to oscillations from said source and to composite video signal recovered by said pickup apparatus for developing amplitude modulated carrier waves comprising a carrier wave component at the frequency of the oscillations from said source, an upper sideband including a frequency translated chrominance signal occupying an intermediate portion thereof, and a lower sideband including a frequency translated chrominance signal occupying an intermediate portion thereof;

a 1H delay line having a passband encompassing substantially only the frequencies of said carrier wave component, said intermediate portion of said lower sideband, and the intervening portion of said lower sideband; said delay line having an input coupled to receive modulated carrier waves developed by said modulating means, and an output at which delayed signals are provided, first comb filter means, including (a) means for combining modulated carrier waves developed by said modulating means with delayed signals provided at the output of said 1H delay line, and (b) a band pass filter responsive to the output of said combining means, and having a passband substantially confined to said intermediate portion of said lower sideband, for developing a frequency translated chrominance signal output substantially free of luminance signal components, and comprising sidebands of a color subcarrier falling at a third frequency corresponding to the difference in frequency between said first and second frequency values;

a first band rejection filter responsive to the modulated carrier wave signals developed by said modulating means and having a rejection band encompassing the frequencies of said intermediate portion of said upper sideband;

a second band rejection filter responsive to the delayed signals provided at the output of said delay line and having a rejection band encompassing the frequencies of said carrier wave component and a contiguous segment of said intervening portion of said lower sideband;

second comb filter means, including (1) means for combining signals passed by said first and second band rejection filters, (2) amplitude modulation detecting means responsive to the output of said last-named signal combining means, and (3) low pass filter means responsive to the output of said detecting means and having a passband encompassing said given band of frequencies, for developing a luminance signal output substantially free of chrominance signal components; and adding means responsive to the outputs of said first and second comb filter means for forming a transcoded composite video signal output.

12. Apparatus in accordance with claim 11 also including means, responsive to departures from said first frequency value of the color subcarrier frequency of the composite video signals recovered by said pickup apparatus, for causing consonant departures from said second frequency value of the frequency of the oscillations from said source in such a sense as to maintain the color subcarrier frequency of said transcoded composite video signal output substantially constant at said third frequency value.

13. Apparatus in accordance with claim 12 wherein said rejection band of said first band rejection filter extends below said intermediate portion of said upper sideband, and wherein the characteristics of said first and second band rejection filters are so related that a lower sideband frequency at which said second band rejection filter provides signal attenuation of three decibels magnitude is spaced from said second frequency value by the same frequency difference as an upper sideband frequency at which said first band rejection filter provides signal attenuation of three decibels magnitude.

* * * * *